(12) United States Patent
Henn et al.

(10) Patent No.: US 12,422,037 B2
(45) Date of Patent: Sep. 23, 2025

(54) DRIVE ASSEMBLY AND VEHICLE HAVING SUCH A DRIVE ASSEMBLY

(71) Applicant: Robert Bosch GmbH, Stuttgart (DE)

(72) Inventors: Andreas Henn, Aalen (DE); Benjamin Lukas Mehnert, Schwieberdingen (DE); Manfred Saretzki, Stuttgart (DE); Martin Armbruster, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/694,057

(22) PCT Filed: Sep. 12, 2022

(86) PCT No.: PCT/EP2022/075297
§ 371 (c)(1),
(2) Date: Mar. 21, 2024

(87) PCT Pub. No.: WO2023/046515
PCT Pub. Date: Mar. 30, 2023

(65) Prior Publication Data
US 2025/0146568 A1    May 8, 2025

(30) Foreign Application Priority Data
Sep. 27, 2021    (DE) ..................... 10 2021 210 737.0

(51) Int. Cl.
*F16H 57/029*    (2012.01)
*F16H 57/021*    (2012.01)
*F16H 57/04*    (2010.01)

(52) U.S. Cl.
CPC ......... *F16H 57/029* (2013.01); *F16H 57/021* (2013.01); *F16H 57/0424* (2013.01);
(Continued)

(58) Field of Classification Search
CPC .. F16H 57/029; F16H 57/021; F16H 57/0424; F16H 57/045; F16H 57/0471; F16H 57/0472
See application file for complete search history.

(56) References Cited

U.S. PATENT DOCUMENTS

| | | | | |
|---|---|---|---|---|
| 3,234,808 | A * | 2/1966 | Nelson | F16H 1/20 74/606 R |
| 3,242,754 | A * | 3/1966 | Reed | F16H 1/06 74/421 R |

(Continued)

FOREIGN PATENT DOCUMENTS

| | | |
|---|---|---|
| DE | 8705477 U1 | 8/1988 |
| DE | 102011088644 A1 | 6/2013 |

(Continued)

OTHER PUBLICATIONS

Translation of International Search Report for Application No. PCT/EP2022/075297 dated Dec. 12, 2022 (2 pages).

*Primary Examiner* — Michael A Riegelman
(74) *Attorney, Agent, or Firm* — Michael Best & Friedrich LLP

(57) ABSTRACT

The invention relates to a drive assembly (10) comprising a transmission which has a shaft (12) and a first rolling bearing (16), wherein the shaft is mounted in the first rolling bearing, wherein the transmission comprises a radial shaft sealing ring (18) which sealingly rests against the shaft and seals off the transmission with respect to the outside; wherein the transmission also comprises a retaining ring (20) which is disposed in a gap (24) axially between the first rolling bearing and the radial shaft sealing ring, the retaining ring being designed to retain a fluid (22) in the gap between the first rolling bearing and the radial shaft sealing ring. The invention also relates to a vehicle having a drive assembly of this type.

19 Claims, 4 Drawing Sheets

(52) U.S. Cl.
CPC ....... *F16H 57/045* (2013.01); *F16H 57/0471* (2013.01); *F16H 57/0472* (2013.01)

(56) References Cited

U.S. PATENT DOCUMENTS

| | | | | | |
|---|---|---|---|---|---|
| 4,241,959 | A | * | 12/1980 | Frister | F16N 7/36 384/472 |
| 4,413,829 | A | * | 11/1983 | Pietsch | F16J 15/324 277/504 |
| 4,964,489 | A | * | 10/1990 | Patel | F16N 7/18 184/13.1 |
| 5,520,468 | A | * | 5/1996 | Iguchi | F16C 33/6659 384/473 |
| 5,643,126 | A | * | 7/1997 | Hotta | F16H 57/0482 184/6.12 |
| 5,934,156 | A | * | 8/1999 | Phillips | F16H 57/029 74/606 R |
| 7,118,324 | B1 | * | 10/2006 | Hinrichs | F16J 15/3404 415/113 |
| 7,980,361 | B2 | * | 7/2011 | Omoto | F16H 57/0427 184/6.12 |
| 8,636,113 | B2 | * | 1/2014 | Knoblauch | F16H 57/0427 384/473 |
| 2007/0111846 | A1 | * | 5/2007 | Metten | F16H 57/082 475/331 |
| 2012/0129614 | A1 | * | 5/2012 | Knoblauch | F16H 57/0427 464/7 |
| 2015/0159697 | A1 | * | 6/2015 | Fischer | F16C 33/664 428/156 |
| 2015/0285367 | A1 | * | 10/2015 | Boeing | F16H 57/025 464/7 |
| 2015/0308557 | A1 | * | 10/2015 | Boeing | F16H 57/025 464/7 |
| 2022/0196136 | A1 | * | 6/2022 | Schütterle | F16H 57/0471 |
| 2024/0093776 | A1 | * | 3/2024 | Wu | F16H 57/0472 |
| 2024/0328497 | A1 | * | 10/2024 | Gyarmati | F16H 57/0483 |

FOREIGN PATENT DOCUMENTS

| | | |
|---|---|---|
| DE | 102010052310 B4 | 8/2014 |
| EP | 1457714 B1 | 2/2007 |
| EP | 2317181 A1 | 5/2011 |

* cited by examiner

DRIVE ASSEMBLY AND VEHICLE HAVING SUCH A DRIVE ASSEMBLY

BACKGROUND

The invention relates to a drive assembly, in particular for a vehicle and to a vehicle.

Transmissions are lubricated with a lubricant, usually lubricating oil, to reduce friction and wear as well as for cooling. To increase transmission efficiency and reduce costs, an oil pump for pumping the lubricant in the transmission is dispensed with wherever possible. In transmissions without an oil pump, the individual transmission elements are lubricated and cooled by passive lubricating oil distribution via the gears splashing in the lubricating oil (splash lubrication). Collecting reservoirs and corresponding geometries in the housing allow the lubricating oil to be directed specifically to the components to be lubricated/cooled (e.g., bearings, radial shaft sealing ring, etc.). The circulation and delivery rate of the lubricating oil through the gears depend directly on the speed and temperature (oil viscosity).

If there is little or no lubricating oil, this can lead to increased wear and even failure of the respective components. Too much lubricating oil can lead to increased losses in the bearing or to leakage problems at the radial shaft sealing ring. The bearings can be lubricated using deep-hole drilling, for example. However, these are complex and expensive to produce.

EP 1 457 714 B1 and DE 10 2010 052 310 B4 each describe the use of a baffle plate between a radial shaft sealing ring and a bearing for guiding a lubricant used to cool or lubricate the bearing.

The disadvantage of this is that the lubrication of the bearing and the targeted supply of lubricating oil to the bearing points and the radial shaft sealing ring cannot be guaranteed in all operating states.

SUMMARY

According to the invention, a drive assembly is proposed, in particular for a vehicle, comprising a transmission with a shaft and a first rolling bearing. The shaft can be designed as an input shaft. The first rolling bearing can be designed as an input rolling bearing.

The shaft is mounted in the first rolling bearing. The transmission also comprises a radial shaft sealing ring that sealingly rests against the shaft and seals off the transmission with respect to the outside. The transmission also comprises a retaining ring, which is disposed axially in a gap between the first rolling bearing and the radial shaft sealing ring. The retaining ring is designed to retain (catch or collect) a fluid in a gap between the first rolling bearing and the radial shaft sealing ring. The fluid can be a lubricant, in particular lubricating oil.

One of the advantages of the design according to the invention is that the fluid can be directed to the first rolling bearing and the radial shaft sealing ring in a targeted and reliable manner. The volume of fluid supplied to the first rolling bearing and the radial shaft sealing ring can be specifically adjusted (reduced or increased) using the retaining ring. As a result, bearing losses on the first rolling bearing and leaks on the radial shaft sealing ring can be at least significantly reduced or completely prevented.

For example, by reducing the amount of fluid reaching the radial shaft sealing ring, another radial shaft sealing ring including a discharge function of the shaft voltage can be used without leaks, thus eliminating the need for a second earthing ring or similar.

According to a further development, the retaining ring can have a flat ring body with a passage. The wave can penetrate the passage. In other words, the shaft extends through the passage in particular. The passage can be circular. The passage can be disposed centrally in the ring body. A trough-like section can be disposed on the ring body. The retaining ring can be designed to retain (catch or collect) the fluid within the trough-like section.

According to a further development, at least one chamber can be disposed between the ring body of the retaining ring and the radial shaft sealing ring. In particular, the chamber is bounded axially by the ring body and the radial shaft sealing ring. The chamber can be bounded radially inwards by the shaft (or its outer circumference). The chamber can be bounded radially outwards at least partially by wall sections of a transmission housing (in which the transmission is disposed), by a section of the radial shaft sealing ring, and/or by a section of the ring body. In particular, the chamber can have the shape of an annular space.

The ring body can have at least one bulge (oil drain) projecting into the trough-like section. In particular, the bulge can be disposed at the lower end of the ring body in relation to the direction of gravity. The bulge can be designed to drain fluid that has built up in the chamber out of the chamber (i.e., away from the radial shaft sealing ring).

In particular, the bulge together with a wall section of the transmission housing defines a section of a fluid or lubricant channel that leads from the chamber or from the radial shaft sealing ring, for example to another rolling bearing. In other words, the bulge can be used to create a flow connection between the chamber and a bearing seat of the other rolling bearing.

In the present case, "axial" or "axial direction" refers to a direction parallel to the central longitudinal axis of the shaft. Accordingly, "radial" or "radial direction" means a direction perpendicular to the central longitudinal axis of the shaft and starting from the central longitudinal axis.

According to a further development, the ring body can have at least one opening. In particular, the opening can be disposed on the upper section of the ring body in relation to the direction of gravity. The gap and the chamber can be fluidically coupled or flow-connected by means of the opening.

Alternatively or additionally, the gap and the chamber can be fluidically coupled or flow-connected by means of the passage. In particular, a free annular space between the outer diameter of the shaft and the inner diameter of the passage forms a flow connection between the gap and the chamber.

A fluidic connection or flow connection in this case means that a gas and/or a fluid (liquid) can flow between two fluidically coupled elements or between two elements in fluidic connection.

By varying the shape and/or diameter of the opening and/or passage, the amount of fluid that can flow between the gap and the chamber can be adjusted.

According to a further development, the trough-like section can have a wall that bounds the trough-like section in the direction of the first rolling bearing. The trough-like section can be bounded in the direction of the radial shaft sealing ring by means of the ring body. In other words, the trough-like section is bounded in the axial direction by the wall and by the ring body.

According to a further development, the wall can have a smaller radial extension (i.e., directed radially inwards) than the section of the ring body that bounds the trough-like section in the direction of the radial shaft sealing ring. In other words, the wall has in particular a lower height (in relation to the direction of gravity) and/or a smaller surface area than the section of the ring body that bounds the trough-like section in the direction of the radial shaft sealing ring.

This ensures that the fluid from the trough-like section, as soon as it is filled with fluid, can (initially) flow in the direction of the first rolling bearing and not in the direction of the radial shaft sealing ring or the chamber disposed between the ring body of the retaining ring and the radial shaft sealing ring.

According to a further development, the transmission can have at least one fluid collection chamber for collecting the fluid (storage) and at least one feed channel. The fluid collection chamber and/or the feed channel can be designed to feed the fluid from the fluid collection chamber to the gap by means of the feed channel. In particular, the feed channel fluidically connects the fluid collection chamber and the gap with each other.

The drive assembly can have an electric machine that can be coupled to the shaft so that the electric machine can drive the shaft in rotation.

The drive assembly can, for example, be designed as an E-axis or form part of an E-axis.

According to a further development, the transmission can have at least one discharge channel. The discharge channel can be designed to discharge the fluid present in the gap from the gap in relation to the direction of gravity in the upper area, in particular above the trough-like section.

According to a further development, the transmission can comprise a second rolling bearing. The second rolling bearing can be designed as an intermediate shaft bearing. The discharge channel can be designed to feed the fluid from the gap to the second rolling bearing. The gap and the second rolling bearing are fluidically coupled to each other, in particular by means of the discharge channel.

According to the invention, a vehicle, in particular a motor vehicle, is proposed having a drive assembly according to the above embodiments. With respect to the advantages that can be achieved in this way, reference is made to the explanations regarding the drive assembly. The measures described and/or discussed below in connection with the drive assembly can serve the further design of the vehicle.

BRIEF DESCRIPTION OF THE DRAWINGS

An embodiment of the invention is explained below with reference to the accompanying drawings. Shown are.

DETAILED DESCRIPTION

Figure 1:
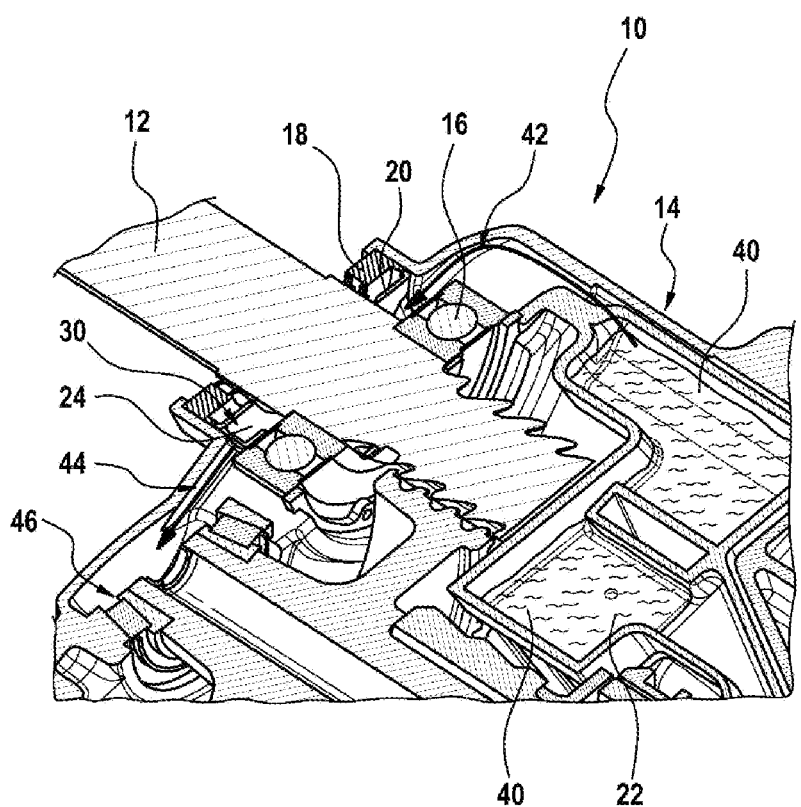
FIG. 1 a perspective sectional view of a part of a drive assembly.

In FIG. 1, the drive assembly as a whole bears the reference number 10. The drive assembly 10 comprises a transmission 14 with a shaft 12 and a first rolling bearing 16. The shaft 12 is mounted in the first rolling bearing 16. The transmission 14 also comprises a radial shaft sealing ring 18. The sealing ring sealingly rests against the shaft 12 and seals off the transmission 14 with respect to the outside.

The first rolling bearing 16 and the radial shaft sealing ring 18 bounds a gap 24. The transmission also comprises a retaining ring 20, which is disposed axially between the first rolling bearing 16 and the radial shaft sealing ring 18 (i.e., in the gap 24). The retaining ring 20 is designed to retain a fluid 22, in this case in the form of lubricating oil, in the gap 24.

In the present case, the transmission 14 has two fluid collection chambers 40 for collecting and storing the fluid 22. The two fluid collection chambers 40 are fluidically connected to each other. The transmission 14 further comprises a feed channel 42, wherein the feed channel 42 fluidically connects the two fluid collection chambers 40 with the gap 24. In other words, the fluid 22 collected in the fluid collection chambers 40 can be supplied to the gap 24 by means of the feed channel 42. The corresponding flow of the fluid 22 is indicated in FIG. 1 by a curved arrow.

The transmission 14 also has a discharge channel 44. The discharge channel 44 fluidically connects the gap 24 with a second rolling bearing 46. In other words, the fluid 22 can be directed from the gap 24 via the discharge channel 44 to the second rolling bearing 46. The corresponding flow of fluid 22 is indicated by a straight arrow in FIG. 1.

Figure 2:
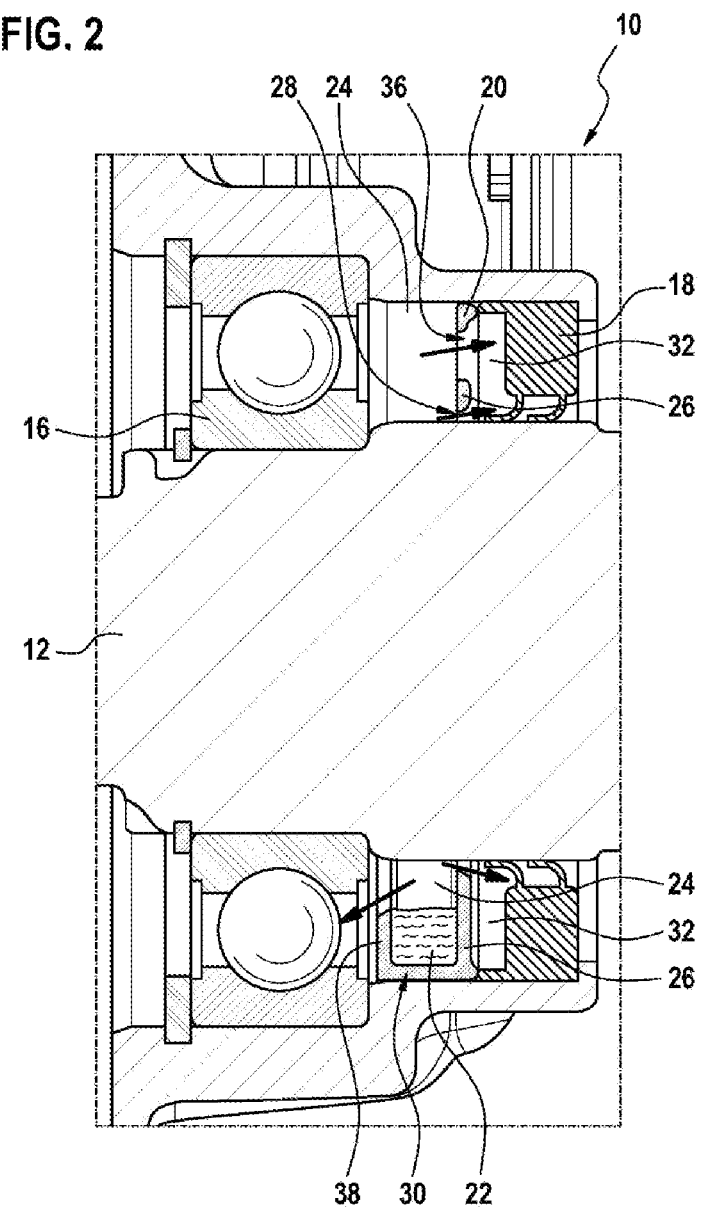
FIG. 2 a sectional view of a part of the drive assembly according to FIG. 1.

FIG. 2 shows a sectional view of a part of the drive assembly 10 as shown in FIG. 1. The direction of gravity points downwards in FIG. 2. The retaining ring 20 has a flat ring body 26 with a circular and centrally disposed passage 28 in which the shaft 12 is disposed.

At its upper section in relation to the direction of gravity (i.e., at the top in FIG. 2), the ring body 26 has an opening 36. At its lower section in relation to the direction of gravity (i.e., at the bottom in FIG. 2), the ring body 26 has a trough-like section 30.

A chamber 32 is disposed between the retaining ring 20 and the radial shaft sealing ring 18. This is annular in shape and is bounded in the axial direction by the radial shaft sealing ring 18 and the ring body 26 of the retaining ring 20. In the radial direction, the chamber 32 is bounded on the one hand by the outer circumference of the shaft 12 (radially inwards) and on the other hand by a section of the retaining ring 20 and a section of the radial shaft sealing ring 18 (radially outwards).

The fluid 22 directed into the gap 24 may be directed from the gap 24 into the chamber 32 through the opening 36 and the passage 28 (or the radial gap between the inner circumference of the passage 28 and the outer circumference of the shaft 12). The corresponding flow of fluid 22 is indicated by arrows in FIG. 2. By varying the diameter of the opening 36 and/or the passage 28, the amount of fluid 22 that is directed from the gap 24 into the chamber 32 can be selectively adjusted.

The trough-like section 30 has a wall 38 which bounds the trough-like section 30 in the direction of the first rolling bearing 16 (to the left in FIG. 2). The fluid 22 directed into the gap 24 is collected in the trough-like section 30 of the retaining ring 20. As soon as the trough-like section 30 is filled with the fluid 22, the fluid 22 initially flows out of the trough-like section 30 in the direction of the first rolling bearing 16. The corresponding flow of fluid 22 is indicated by an arrow in FIG. 2.

For this purpose, the wall 38 is designed in such a way that the radial extension of the wall 38 is smaller than the radial extension of the ring body 26, which bounds the trough-like section 30 in the direction of the radial shaft sealing ring 18 (to the right in FIG. 2). The wall 38, in other words, has a lower height (relative to the direction of gravity) than the ring body 26, which bounds the trough-like section 30 in the direction of the radial shaft sealing ring 18.

Figure 3:
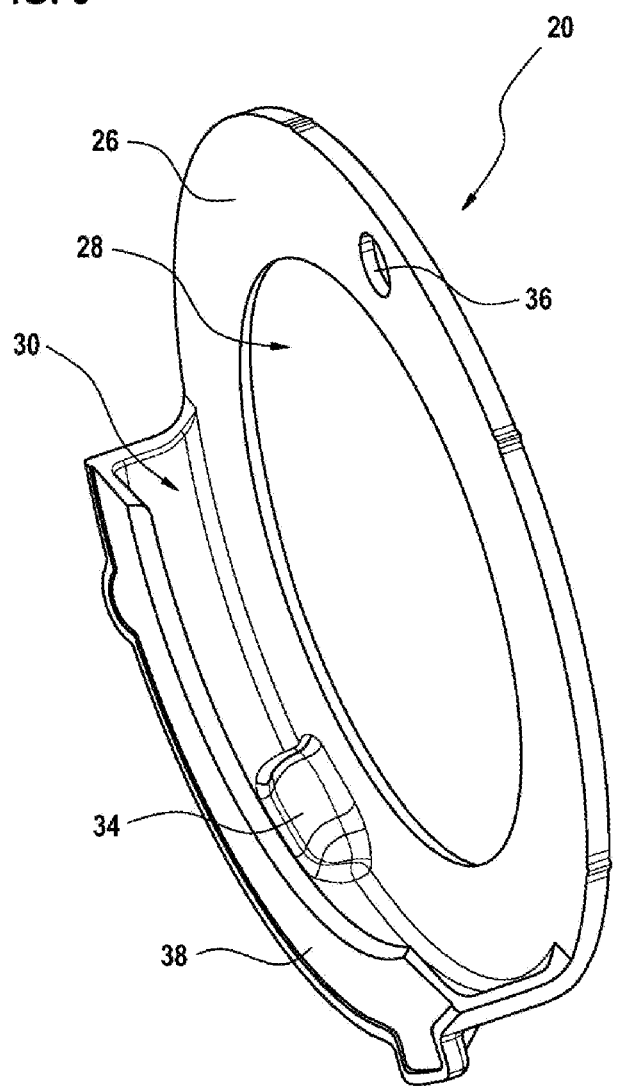
FIG. 3 a perspective view of a retaining ring.
Figure 4:
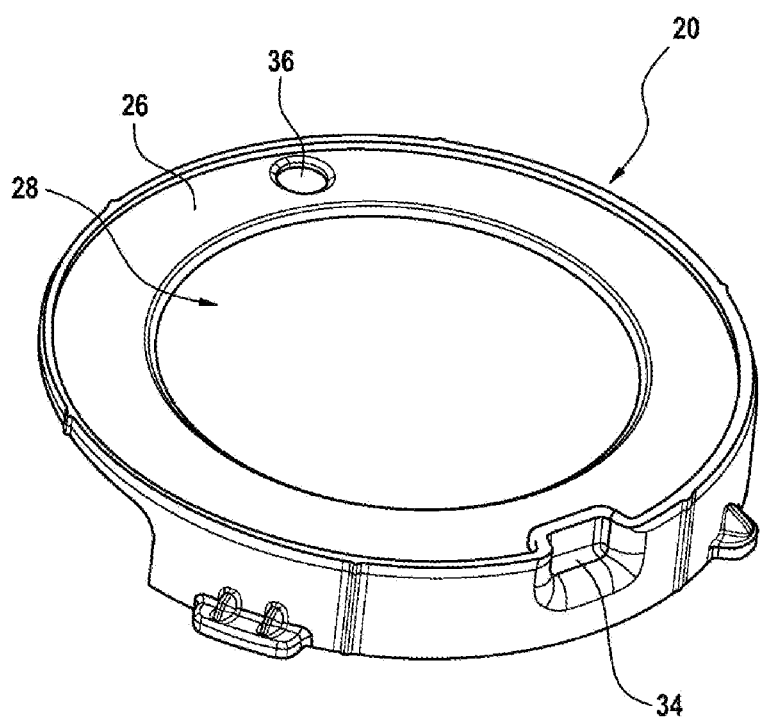
FIG. 4 another perspective view of the retaining ring shown in FIG. 3.

FIG. 3 shows a perspective view of the retaining ring 20 according to a further design. FIG. 4 shows a further perspective view of the retaining ring 20 as shown in FIG. 3. It can be seen that the ring body 26 of the retaining ring 20 has a bulge 34 at its lower end in relation to the direction of gravity, which projects into the trough-like section 30.

The bulge 34, together with a wall section of a transmission housing which bounds the transmission 14 with respect to the outside, forms a section of a fluid or lubricant channel which leads from the radial shaft ring 18, for example, to a further rolling bearing (not shown). In other words, fluid 22 can be discharged from the chamber 32 by means of the bulge 34.

The invention claimed is:

1. A drive assembly (10) comprising a transmission (14) with a shaft (12) and a first rolling bearing (16), the shaft (12) being mounted in the first rolling bearing (16), the transmission (14) comprising a radial shaft sealing ring (18) which sealingly rests against the shaft (12) and seals off the transmission (14) with respect to outside, wherein the transmission (14) also comprises a retaining ring (20) which is disposed axially in a gap (24) between the first rolling bearing (16) and the radial shaft sealing ring (18), the retaining ring (20) being configured to retain a fluid (22) in the gap (24) between the first rolling bearing (16) and the radial shaft sealing ring (18), wherein the retaining ring (20) has a flat ring body (26) with a passage (28) through which the shaft (12) passes, and a trough-like section (30) disposed on the flat ring body (26), the retaining ring (20) being configured to retain the fluid (22) within the trough-like section (30), wherein the trough-like section (30) has a wall (38), the trough-like section (30) being bounded by the wall (38) in a direction of the first rolling bearing (16) and by the flat ring body (26) in a direction of the radial shaft sealing ring (18).

2. The drive assembly (10) according to claim 1, wherein at least one chamber (32) is disposed between the flat ring body (26) of the retaining ring (10) and the radial shaft sealing ring (18), the flat ring body (26) having at least one bulge (34) projecting into the trough-like section (30), the at least one bulge (34) being configured to discharge fluid (22) retained in the at least one chamber (32) from the at least one chamber (32).

3. The drive assembly (10) according to claim 2, wherein the flat ring body (26) has an opening (36), the gap (24) and the at least one chamber (32) being fluidically coupled to one another by the opening (36) and/or by the passage (28).

4. The drive assembly (10) according to claim 3, wherein the opening (36) is at an upper section of the flat ring body (26) with respect to a direction of gravity.

5. The drive assembly (10) according to claim 2, wherein the at least one bulge (34) is at a lower end of the flat ring body (26) with respect to a direction of gravity.

6. The drive assembly (10) according to claim 1, wherein the wall (38) has a smaller radial extension than a section of the flat ring body (26) which bounds the trough-like section (30) in the direction of the radial shaft sealing ring (18).

7. The drive assembly (10) according to claim 1, wherein the transmission (14) has at least one fluid collection chamber (40) for collecting the fluid (22) and at least one feed channel (42), the at least one fluid collection chamber (40) and/or the at least one feed channel (42) being configured to feed the fluid (22) from the at least one fluid collection chamber (40) to the gap (24) via the at least one feed channel (42) and/or wherein the drive assembly (10) has an electric machine which is coupled to the shaft (12), so that the electric machine can drive the shaft (12) in rotation.

8. The drive assembly (10) according to claim 1, wherein the transmission (14) has at least one discharge channel (44), the at least one discharge channel (44) being configured to discharge the fluid (22) present in the gap (24) from the gap (24) in an upper region of the trough-like section (30) with respect to a direction of gravity.

9. The drive assembly (10) according to claim 8, wherein the transmission (14) comprises a second rolling bearing (46), wherein the at least one discharge channel (44) is configured to feed the fluid (22) from the gap (24) to the second rolling bearing (46).

10. The drive assembly (10) according to claim 9, wherein the second rolling bearing (46) is an intermediate shaft bearing.

11. A vehicle having a drive assembly (10) according to claim 1.

12. The drive assembly (10) according to claim 1, wherein the shaft (12) is an input shaft.

13. The drive assembly (10) according to claim 1, wherein the first rolling bearing (16) is an input shaft bearing.

14. The drive assembly (10) according to claim 1, wherein the fluid (22) is a lubricant.

15. The drive assembly (10) according to claim 1, wherein the passage (28) is circular and/or centrally disposed.

16. A drive assembly (10) comprising a transmission (14) with a shaft (12) and a first rolling bearing (16), the shaft (12) being mounted in the first rolling bearing (16), the transmission (14) comprising a radial shaft sealing ring (18) which sealingly rests against the shaft (12) and seals off the transmission (14) with respect to outside, wherein the transmission (14) also comprises a retaining ring (20) which is disposed axially in a gap (24) between the first rolling bearing (16) and the radial shaft sealing ring (18), the retaining ring (20) being configured to retain a fluid (22) in the gap (24) between the first rolling bearing (16) and the radial shaft sealing ring (18), wherein the retaining ring (20) has a flat ring body (26) with a passage (28) through which the shaft (12) passes, and a trough-like section (30) disposed on the flat ring body (26), the retaining ring (20) being configured to retain the fluid (22) within the trough-like section (30), wherein at least one chamber (32) is disposed between the flat ring body (26) of the retaining ring (10) and the radial shaft sealing ring (18), the flat ring body (26) having at least one bulge (34) projecting into the trough-like section (30), the at least one bulge (34) being configured to discharge fluid (22) retained in the at least one chamber (32) from the at least one chamber (32).

17. The drive assembly (10) according to claim 16, wherein the at least one bulge (34) is at a lower end of the flat ring body (26) with respect to a direction of gravity.

18. The drive assembly (10) according to claim 16, wherein the flat ring body (26) has an opening (36), the gap (24) and the at least one chamber (32) being fluidically coupled to one another by the opening (36) and/or by the passage (28).

19. The drive assembly (10) according to claim 18, wherein the opening (36) is at an upper section of the flat ring body (26) with respect to a direction of gravity.

* * * * *